US005665448A

United States Patent [19]

Graham et al.

[11] Patent Number: 5,665,448

[45] Date of Patent: Sep. 9, 1997

[54] ELECTROSTATIC DISPLAY DEVICE

[76] Inventors: Barbara Graham, 6410 Northway Dr., Spring, Tex. 77389; Katherine L. Kilman, 3212 44th St., Lubbock, Tex. 79413; Robert L. Graham, 6410 Northway Dr., Spring, Tex. 77389

[21] Appl. No.: 294,921

[22] Filed: Aug. 24, 1994

[51] Int. Cl.[6] .............................. B32B 27/02; B44C 5/04

[52] U.S. Cl. ..................... 428/79; 428/542.2; 428/542.8; 428/904.4

[58] Field of Search .............................. 428/7, 16, 542.2, 428/542.8, 286, 904.4, 79

[56] References Cited

U.S. PATENT DOCUMENTS

| | | | |
|---|---|---|---|
| 2,079,550 | 5/1937 | DeMott | 446/98 |
| 2,093,207 | 9/1937 | Munson, Jr. | 446/98 |
| 2,331,776 | 10/1943 | Heggedal | 446/98 |
| 3,646,705 | 3/1972 | Nicholson | 446/98 |
| 4,215,682 | 8/1980 | Kubik et al. | 264/22 X |
| 4,225,369 | 9/1980 | Felchlin | 428/14 X |
| 4,275,112 | 6/1981 | Savage, Jr. | 428/337 X |
| 4,904,174 | 2/1990 | Moosmayer et al. | 264/22 X |
| 4,992,121 | 2/1991 | Rubino | 428/904.4 X |
| 5,178,573 | 1/1993 | Smith | 446/98 |
| 5,418,020 | 5/1995 | Crane | 428/12 |
| 5,486,411 | 1/1996 | Hassenboehler, Jr. et al. | 428/286 |
| 5,592,357 | 1/1997 | Rader et al. | 361/225 |

*Primary Examiner*—Henry F. Epstein
*Attorney, Agent, or Firm*—R. L. Graham

[57] ABSTRACT

A device for detachably adhering a manipulative to a substrate using electrostatic charges is described. The invention comprises a thermoplastic substrate having imparted thereto a substantially persistent electrostatic charge with paper and/or fabric manipulatives removably adhered thereto by electrostatic attraction. The present invention may be useful for creating visual displays such as display boards, design boards for quilting patterns, sewing patterns, and toys such as dolls and educational games or aides using manipulatives in visual displays. The substrate is preferably made of polyolefin nonwoven webs, particularly polypropylene or polyethylene meltblown webs.

16 Claims, 3 Drawing Sheets

ELECTROSTATIC DISPLAY DEVICE

BACKGROUND

The present invention relates to manipulative articles which are detachably adhered to a substrate by the action of electrostatic charges. In one aspect it relates to manipulative articles which are detachably adhered to a substrate by electrostatic forces. Either the manipulative article, the substrate, or both are made of an electrostatic nonwoven web or film. In a specific aspect, the invention relates to a visual display device which has a substrate comprising an electrostatically charged nonwoven fabric whereon informational and/or decorative manipulative articles are adhered for repeated attachment. In the specification below, the manipulative article is referred to as simply a manipulative for brevity, it being understood that the term manipulative refers to any manipulative article or object in accordance with the present invention.

There are a number of display devices which employ manipulatives that may be removably secured to a substrate by hand. These include informational and decorative displays such as bulletin and display boards, design boards for fiber arts such as quilting, toys such as dolls wherein clothing cut-outs are repeatedly attached, and sewing patterns temporarily secured to a fabric for cutting the fabric to a desired shape, to name a few.

As is well known, many bulletin, display, and design boards found in schools, offices, studios, and homes comprise a cork-type board whereon is tacked or pinned a covering of paper or fabric and informational and/or decorative manipulatives are tacked, pinned, or glued onto the paper or fabric cover. There are undesirable aspects to this approach which include holes formed in the manipulative by tacks or pins which after repeated use can cause the manipulative to tatter and eventually render it useless. Holes formed in the paper or fabric covering the board in time can also appear unsightly, requiring the entire cover to be replaced. There are also safety problems associated with using tacks to secure the manipulative in the event a small child may be decorating the display board, as frequently occurs in elementary schools. In the case of using glue to attach a manipulative to the board, it may not be possible to detach the manipulative from the paper or fabric covering for reuse at a later time. The inability to reuse and easily rearrange manipulatives for display and design boards is obviously wasteful in both materials and labor, as can be appreciated from the standpoint of school teachers and designers who arrange and rearrange visual displays with some frequency.

Another use of visual displays is in games and educational aids that use manipulatives detachably secured to a substrate such as magnetic shapes secured to a metal board.

A number of approaches have been taken for detachably securing clothing cut-outs and the like to paper dolls and other playthings. U.S. Pat. No. 3,646,705 discloses a paper doll having a body formed of a stiff paper material whereon a velour sheet is attached using an adhesive, the sheet being cut in the form of an undergarment and adhered to the body at the appropriate location. The exposed surface of the velour sheet is covered by cotton fibers which form nubs. The cotton fibers are held to the velour sheet by electrostatic charges applied to the velour before blowing the cotton fibers onto the velour. An outer garment is cut from a fabric which has a napped side and pressed onto the cotton fibers napped side down. The garment is frictionally secured to the body by the interaction of the cotton fibers and fabric napping. Other publications disclosing methods for frictionally securing a clothing cut-out to a doll body include U.S. Pat. Nos. 2,079,550 and 2,093,207. Other methods for adhering doll clothing have made use of ferromagnetism as evidenced by U.S. Pat. No. 5,178,573. Still another method has been to use the sticking action of polished oil cloth as taught by U.S. Pat. No. 2,331,776. When brought into contact, pieces of the oil cloth will stick together under the action of surface tension in the oil. Each of the above methods requires a significant amount of labor intensive surface preparation to achieve the end result of adhering a manipulative (clothing cut-out) to the substrate (paper doll).

As is well known, in the manufacture of garments and the like, the components of the garment (e.g. sleeve, collar, etc.) are cut from fabric stock and then stitched together. A widely practiced method for cutting the components is to pin a paper pattern of the desired shape to the fabric and then cut around the pattern. A problem in this approach is that after repeated use, the pattern can become tattered from the pins inserted in the pattern. Pinning the pattern to the fabric is also time-consuming. Time-consuming taping or pinning is also required to trace and cut sewing patterns from multi-sized master patterns.

In summary, there are numerous applications for adhering a paper or fabric manipulative to a substrate or backing, it being desirable to achieve this end without tacking, gluing, or pinning the manipulative to the substrate and with minimal surface preparation.

As described in detail below, it has been found efficacious to use electrostatic charges applied to either a nonwoven or film manipulative, a nonwoven or film substrate, or both for detachably adhering the two together. It further being found efficacious to employ a substrate constructed from an electrostatically charged meltblown nonwoven fabric or film such as a charged polypropylene fabric or film. The electrostatic forces are between fabric or film, paper, and the like, and, unlike prior art magnetic devices, do not involve the use of metallic members.

Meltblowing is a method whereby a molten thermoplastic material (e.g. polypropylene) is extruded through a row of closely spaced orifices to form molten or semi-molten fibers. Converging sheets of high velocity air are made to contact the fibers on opposite sides to draw-down the extruded fibers to microsized diameters (viz 0.5–20 microns). The fibers and converging air sheets form a fiber-air stream which is blown onto a rotating collector surface where the fibers deposit in a random way to form a nonwoven fabric. The fabric is held together by inter-fiber entanglement and inter-fiber sticking while still in the molten state. By varying operating conditions such as polymer throughput, air velocity, and collector speed, meltblown fabrics of different thickness and basis weight (weight per unit surface area) are produced. Meltblown fabrics constructed according to this method have good strength, excellent tactile hand, and may be electrostatically charged or uncharged.

Since most meltblowing thermoplastics are dialectics, it has been found possible to apply a persistent electrostatic charge to meltblown fabrics. Fabrics so charged are sometimes referred to as electrets, and have been used principally as gas filters where the charges in the electret are very effective in capturing small particles suspended in the gas, which themselves usually carry some electrostatic charge. U.S. Pat. Nos. 4,215,682 and 4,904,174 disclose an apparatus for producing electrets by hot charging and test data illustrating the filtration capabilities of the electret. PCT application PCT/US/93/09630 discloses cold charging methods and apparatus for applying an electrostatic charge to thermoplastic webs and films.

SUMMARY OF THE INVENTION

The present invention is predicated on a manipulative removably adhered to a substrate, either of which is made of thermoplastics, nonwoven webs, or films, by electrostatic attraction therebetween. For purposes of this invention, the terms webs and films may be used interchangeably. While the invention is described with particular reference to meltblown webs, it will be appreciated that this is for illustration only. The invention expressly includes thermoplastic nonwoven webs and films which may be electrostatically charged. However, in some applications the nonwovens, particularly meltblown fabrics, are preferred. The invention employs electrostatically charged thermoplastic nonwoven webs and films and may be adapted to applications including display boards, paper dolls, sewing patterns, and the like. In the case of the display board, the substrate may be a conventional bulletin board which has been covered with a layer of electrostatically charged web or film, preferably a meltblown web, and the manipulatives would be articles of display detachably adhered to the charged web or film under the action of electrostatic attraction. In the doll application, the substrate would be the doll body made of charged web or film, and the manipulatives would be paper, web or film, or other fabric clothing cut-outs electrostatically adhered to the electrostatically charged body. In the case of the sewing pattern, the substrate is a conventional fabric (e.g. woven cloth) to be cut, and the manipulatives are patterns drafted and cut from an electrostatic web or film and electrostatically adhered to the fabric as it is cut. For brevity, the terms substrate and manipulative will be used generically. In many applications, either the manipulative or the substrate may be made of the nonwoven thermoplastic web or film, preferably a meltblown web.

A variety of configurations are contemplated by the present invention. These include an electrostatically charged meltblown web or film substrate and an oppositely charged meltblown web or film manipulative adhered to the substrate. In this case, the manipulative will cling to the oppositely charged substrate since it is well known that opposite charges attract. It has been found that by constructing the manipulative from relatively light-weight meltblown web, the attraction is sufficient to support the weight of the manipulative for arbitrary orientation of the substrate, such as a vertical display board.

Another configuration found efficacious is that of an electrostatically charged web or film substrate with an uncharged manipulative removably adhered thereto by mutual electrostatic attraction. This configuration is useful in creating visual displays wherein a substrate is covered with a charged electret, and the manipulatives may comprise pieces of paper and/or fabrics such as cotton or even uncharged meltblown fabric. In this configuration, the manipulative will cling to the substrate since the electrostatic field around the charged fabric will naturally polarize the mobile charges in the manipulative whereby it will cling to the substrate. There are numerous examples in nature of the phenomenon of an electrostatically charged object clinging to an uncharged object, or vice-versa. For example, an inflated toy balloon when electrostatically charged will cling to a wall, even though the wall itself has not been charged. A sock which has been electrostatically charged in a drier will cling to other fabric which have not been charged. This phenomenon occurs because virtually all materials carry some degree of mobile charges which can be polarized when placed in an electrostatic field. None of these examples, however, involves the use of electrostatically charged nonwoven webs or films in accordance with the present invention.

To summarize, it has been found that electrostatically charged thermoplastic webs and films are useful as substrates whereon manipulatives may be detachably adhered for repeated use. In the case of visual displays such as display boards and paper dolls, it has been found that the substrate may be covered with a charged electret and the articles of display may be either charged electrets themselves, or alternatively may be nominally uncharged pieces of paper and/or fabric which become naturally polarized in the presence of the charged substrate.

MELTBLOWN ELECTROSTATICALLY CHARGED NONWOVEN FABRICS

Figure 1:
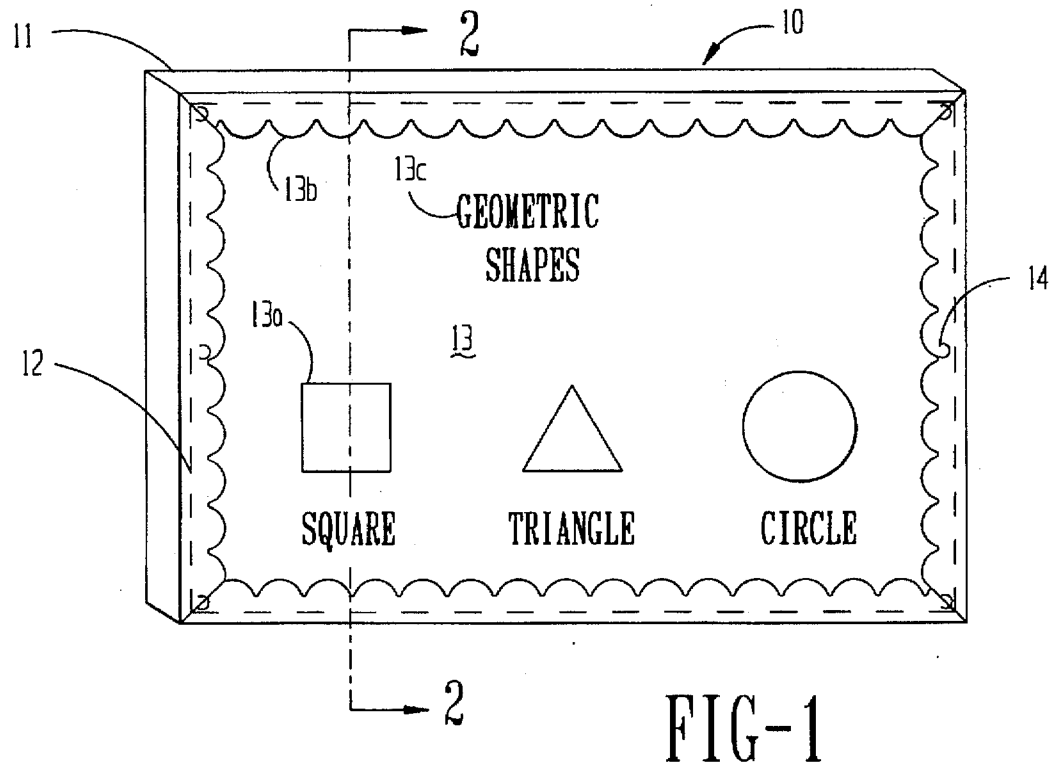
FIG. 1 is a front view of a display board illustrating manipulatives removably adhered to the board.

The electrostatically charged nonwoven web (electrets) useable in the present invention may be made by a number of processes. U.S. Pat. Nos. 4,215,682 and 4,904,174 disclose hot charging methods of charging hot filaments discharging from dies in meltblowing processes for forming meltblown webs. PCT Application PCT/US/93/0930 discloses a cold charging method for electrostatically charging thermoplastic webs or films. The disclosures of U.S. Pat. Nos. 4,215,682, 4,904,174, and PCT Application No. PCT/US/93/09630 are incorporated herein by reference for disclosing methods, compositions, properties, and specifications of the webs and films capable of being electrostatically charged.

The nonwoven webs and films for the applications described below may be made by any of the processes described in the above referenced patents and application. The preferred method, however, is the cold charging method, particularly that described in PCT Application No. PCT/US/93/09630 for webs and film. The fiber size and basis weight, and electrostatic charge of the electret will depend on the application (e.g. manipulative, doll, sewing pattern, etc.).

Thin nonwoven webs (e.g. 0.25 oz/yd$^2$) may be used, but present problems of tearing. Thicknesses can be as large as practicable. Charges can be negative or positive and should be sufficient to adhere the manipulative thereto. The magnitude of the charge should be as large as possible to achieve maximum cling. The preferred web is meltblown, but other nonwovens such as spun-bond fabrics may be used. The following properties of meltblown webs are by way of example:

| | Range | Preferred |
|---|---|---|
| Avg. fiber size (microns) | 1–20 | 1–10 |
| Basis wt. (oz/yd$^2$) | 0.5–5 | 1–4.0 |
| Surface charge potential (v) | −2500 to +2500 | |

The surface charge potential of the side which is to cling to the substrate or manipulative, whether positive or negative, should be in excess of 100 v., preferably in excess of 300 v. and most preferably in excess of 500 v. Ideally the charge should be in excess of 1000 v. The web, prior to or after charging, may be processed through the nip of counter-rotating rollers to compress the web and condition the surfaces.

The surface charge potential of the web may be determined by Monroe Model 244 Isoprobe Electrostatic Voltmeter with a 1017E Probe (0.07 in. opening) connected to a Velmex system which allows webs with dimensions up to 20×38 inches to be scanned with the probe in both the machine (MD) and cross-machine (CD) directions. The measurement system is interfaced with an IBM AT computer using DT 2801 I/O system (Data Translation Inc., Marlborough, Mass.). The average value of the surface charge potential may be computed.

The web or film may be made of any of the thermoplastic described in the above referenced patents and application. For economy, the polyolefins (e.g. PP, PE, and copolymers) particularly polypropylene, is preferred.

The device constructed in accordance with the present invention may have a variety of applications, a representative number of which are described below under Visual Aids and Sewing Crafts.

VISUAL DISPLAY DEVICES

(a) Visual Aids

FIG. 1 illustrates a preferred embodiment of the present invention as comprising a display 10 consisting of a planar support 4, an electrostatically charged web substrate 12, and manipulatives 13 (designated 13*a*, 13*b*, and 13*c*). The particular informational and/or ornamental content of display 10 is, of course, by way of example only. The charged substrate 12 may carry either a positive or negative charge on its outwardly facing surface and in the case where support 11 is a cork-type bulletin board, web 12 may be attached using tacks or pins 14. Alternatively, support 11 may simply be a section of wall with charged substrate 12 taped onto the wall. Electrostatically charged substrate 12 has adhered thereto a number of manipulates 13 which include informational article 13*a*, ornamental boundary 13*b*, and alphabetic symbols 13*c*, each being detachably adhered to charged substrate 12 through the attractive action of electrostatic charges on the substrate and the manipulative.

It has been found by experimentation that insofar as the charges on the substrate 12 and manipulatives 13 are concerned, a variety of possible configurations exist. For example, it has been found effective to form substrate 12 from a meltblown polypropylene web which carries a negative surface potential of between 100 to −2500 v., and to form manipulatives 13 from conventional papers such as construction paper, butcher paper, notebook paper, or even newspaper. Even though the paper is not initially charged, it does have some mobile charges within its molecular structure, and thus the paper becomes naturally polarized when placed in the electrostatic field near the charged substrate 12. The degree of polarization and electrostatic attraction is sufficient to cause the paper manipulative 13 to cling to the charged substrate 12 and will fully support the weight of the manipulative for long periods of time. It has been found equally effective to form charged substrate 12 from a meltblown substrate which carries a positive charge in the range from 100 to 2500 v. (and even higher) and to construct manipulatives 13 from paper materials as discussed. Paper having good stiffness properties may be used for creating manipulatives which maintain their shape as they are used. Alternatively, uncharged pieces of fabric including plant based fabrics such as cotton, animal based fabrics such as wool and silk, man-made fabrics such as meltblown fabrics, and thermoplastic films, have been found to have adequate cling to charged substrates to permit their use as manipulatives. Nominally uncharged fabrics will cling due to the same natural polarization process as has been discussed in connection to paper manipulatives. The manipulatives 13 may be detached and reattached by hand to the substrate 12 with ease. The preferred manipulatives are made of paper.

A second efficacious configuration for creating displays according to the present invention is that wherein the charged substrate 12 is either a positively or negatively charged meltblown web or film having a charge potential in the ranges cited above, and manipulatives 13 are formed from a meltblown web or film having an opposite charge from that imparted to substrate 12. In this configuration the mutual attraction between the oppositely charged substrate and manipulatives acts to removably adhere the manipulative to the substrate. Charged meltblown manipulatives so adhered have been found to remain in engagement for long periods of time of up to one year and beyond. Although not necessary, opposite electrostatic charges may similarly be applied to the initially uncharged papers and conventional fabrics discussed above.

Figure 2:
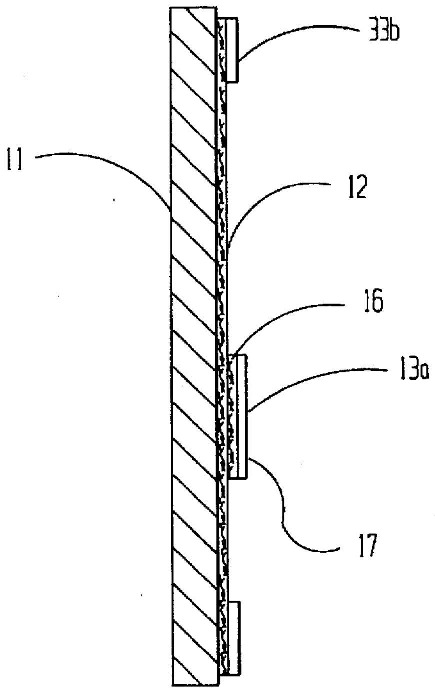
FIG. 2 is a sectional view of a display board taken along line 2—2 of FIG. 1.

FIG. 2 is a cross-sectional view illustrating a preferred embodiment for creating display 10 according to the present invention wherein manipulative 13*a* is a composite. In this configuration the charged substrate 12 may be a meltblown web which has imparted thereto a positive or negative electrostatic charge in the ranges cited above. Composite manipulative 13*a* comprises oppositely charged meltblown web 16 having a stiffness element 17 permanently adhered on its outer face. Element 17 may be a piece of construction paper glued or the like to web 16. The mutual electrostatic attraction between substrate 12 and manipulative 16 is sufficient to removably adhere the composite manipulative 13*a* to the substrate.

It further being contemplated by the present invention that charged meltblown webs or films in and of themselves may be used as manipulatives, as in the case where a charged manipulative may be removably adhered to a conventional bulletin board which is covered with uncharged paper or web. This is simply a reversal of the uncharged manipulative and charged substrate configuration described above. It has also been found that charged webs will effectively cling to a variety of smooth electrically nonconductive surfaces such as glass, wherein it may be an objective to create a decorative display on a window as is often done as part of holiday festivities.

(b) Educational Games and Aids

In the application of the invention as educational games and aids, the substrate will be an electrostatically charged web and the manipulatives may be in the form of geometric shapes and sizes with and without writing, comprised of paper, webs, film, and fabric.

(c) Toy Doll Form

Figure 3:
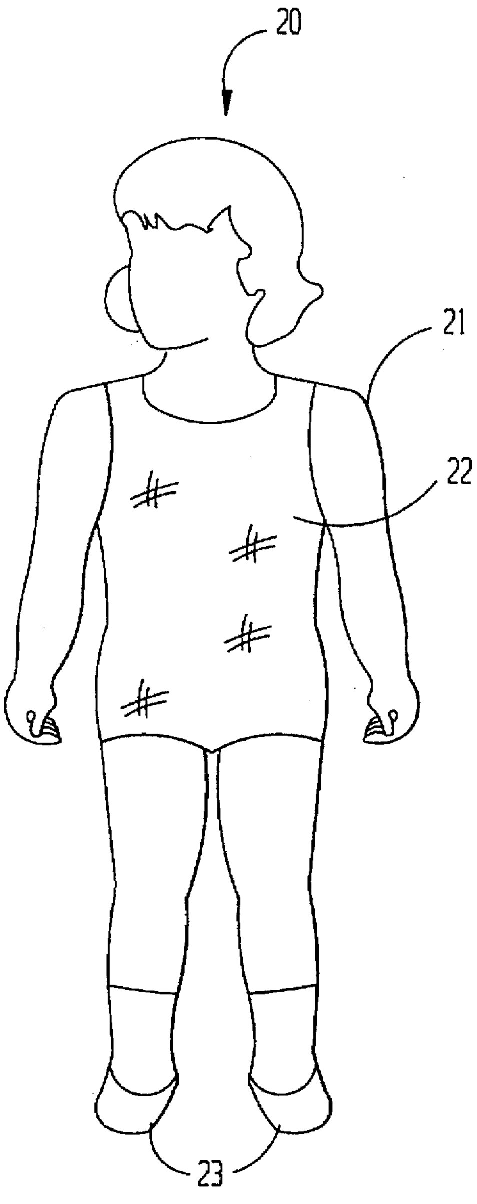
FIG. 3 is a front view of a toy doll substrate having a frontal layer of electrostatically charged meltblown web or film.
Figure 4:
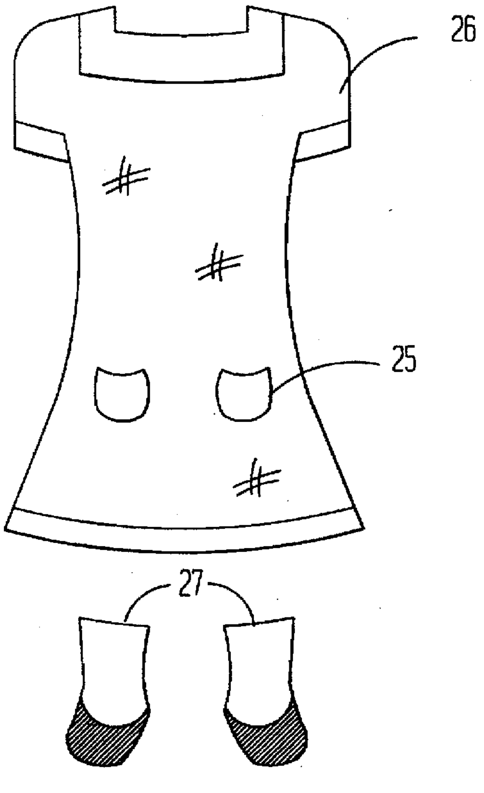
FIG. 4 is a front view of an article of clothing manipulative for detachably adhering to a toy doll.

FIG. 3 illustrates a preferred embodiment of the present invention for adhering representations of clothing cut-outs to a toy doll form. The doll 20 is a composite structure comprising a charged web 21 cut in the shape of a doll body and having permanently adhered to sections of its outer face pieces 22 and 23 of web or paper in the shape of clothing. The doll body 21 preferably is made of a charged nonwoven web. Referring to FIG. 4, manipulatives 26 and 27 are cut in the form of articles of clothing to be detachably adhered to doll body 21. Dress cut-out 26 may be constructed from nominally uncharged papers or uncharged fabrics (woven or nonwoven) or film and may be detachably adhered to charged body 21 according to the same principles of electrostatic attraction as has been described in relation to the adherence of uncharged manipulatives 13 to substrate 12 of FIG. 1. Similarly shoe representations 27 may be adhered to body 21. The manipulatives being adhered by simply pressing with normal hand pressure the manipulative onto the substrate electret and removed by peeling the manipulative away from the electret, the dexterous requirements being with the ordinary skill of most children. The charged body 21 may be either negatively or positively charged in the ranges cited above. To provide adequate support, the basis weight of manipulatives 26 and 27 should preferably be in the range from 0.5 to 3.5 oz/yd$^2$, which is within the range of many commercially available papers and fabrics. As has been described in detail in relation to FIG. 1, manipulatives 26 and 27 may alteratively be formed from nonwoven web material which carries an opposite charge from that imparted to substrate electrets 22 and 23. Manipulatives 26 and 27 may also comprise composite manipulatives having the same structure as has been described in relation to manipulative 13*a* of FIG. 2. The preferred clothing pieces are made of woven fabrics for realistic representation and availability (e.g. scraps).

(d) Quilting

The scope of the present invention is not intended to be limited to the embodiments described in detail above as there are undoubtedly Other applications for the use of a manipulative removably adhered to a substrate by electrostatic attraction. For example, it is widely practiced in the art of interior design to provide swatches of fabrics having different colors which may be carried about for matching the fabrics with existing decor. The present invention contemplates a charged web whereon swatch fabrics of different color may be detachably arranged and rearranged with ease to suit the taste of the designer. Yet another use would be as an aide to quilt designers wherein it is necessary to arrange and rearrange fabric pieces of the quilt to arrive at a pattern that suits the designer. In such an application an electrostatically charged substrate web may be provided and pieces of the outer quilt fabric removably adhered to the substrate by electrostatic attraction.

Figure 5:
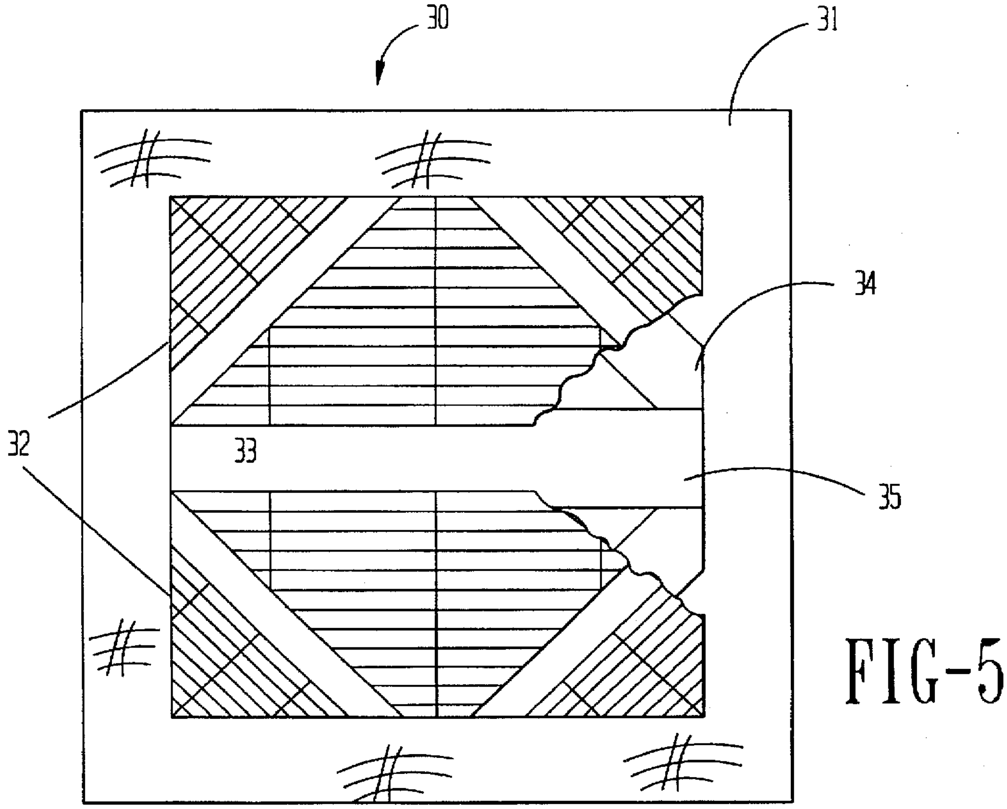
FIG. 5 is a top plan view of a quilt design board showing quilting pieces arranged thereon.

FIG. 5 illustrates a preferred embodiment of the present invention for use as an aid to designers of quilts. Most quilts are an aggregate of individual pieces or blocks which have a predetermined pattern. The block pattern is determined by the color and, equally as important, the orientation of the pieces of fabric which make up the block. FIG. 5 illustrates an embodiment of the present invention which enables a quilt designer to detachably secure pieces of fabric to a substrate to experiment with different block patterns and designs. The particular design of FIG. 5 is by way of illustration only since there are potentially an infinite number of possible designs as would be understood by one of skill in the art. Quilting aid 30 comprises a charged substrate 31 whereon pieces of fabric 32 and 33 are detachably secured by electrostatic attraction. Additional fabric strip pieces 34 and 35 are similarly detachably secured to substrate 31 and underlie (see cut-away section) pieces 32 and 33 for adding ornamentation to the quilt block. Fabric pieces 32, 33, 34, and 35 may be any of the fabrics conventionally used in quilting. Pieces of fabric having different colors, shapes, and/or patterns thereon may be replaced and/or moved about on substrate 31 in any number of combinations and orientations to suit the taste of the designer. The use of the present invention permits the components of the quilt block to be removably oriented and aligned on electret 31 with some precision to more accurately ascertain the visual effect of the block pattern. Although a single quilt block is illustrated in FIG. 5, the present invention contemplates the use of a much larger substrate whereon a plurality of blocks may be oriented side-by-side to visualize the overall pattern of the quilt.

(e) Sewing Patterns

Figure 6:
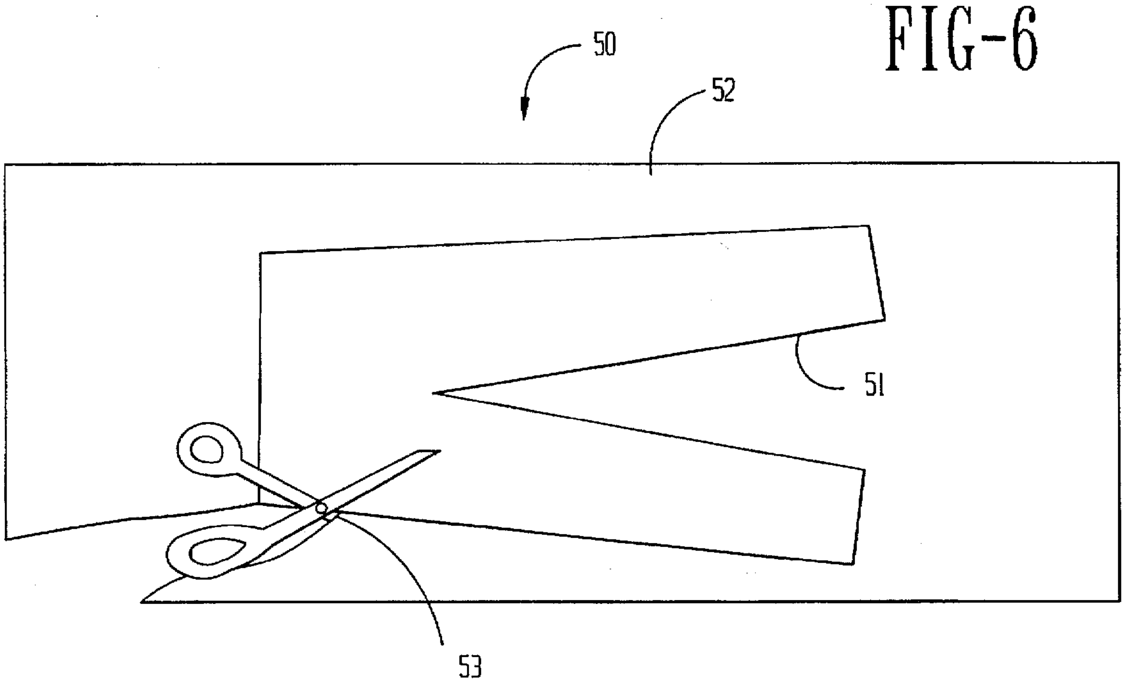
FIG. 6 is an elevational plan view of an uncharged fabric having electrostatically adhered thereto a sewing pattern which comprises an electrostatically charged meltblown web or film.

FIG. 6 illustrates a preferred embodiment of the present invention as applied to sewing patterns 50 for cutting fabrics to a desired shape. In this embodiment a piece of electrostatically charged nonwoven web is cut to a predetermined shape as dictated by the article of clothing to be constructed, and by way of illustration is shown in FIG. 6 as a section of trouser leg 51. In this embodiment a section of conventional fabric 52 to be cut in the shape of a trouser leg is first laid on a flat surface and charged web pattern 51 is spread smoothly over fabric 52. It has been found by this method that web pattern 51 will cling under the action of electrostatic attraction to fabric 52 with sufficient strength so that fabric 52 may be cut as at 53 with adequate accuracy to the desired shape, even though fabric 52 may be moved about as it is cut. A number of fabrics 52 may be used in combination with meltblown fabric 51, the preferred web, including fabrics having plant based fibers such as cotton, animal based fibers such as wool and silk, and man-made fibers such as meltblown fabrics. The approach of the present invention eliminates the need for pinning the pattern to the fabric as is normally done with paper patterns. Manipulative web pattern 51 may carry a positive or negative charge preferably in the ranges cited above.

(f) Pattern Making

The patterns described above may be made by laying a thin transparent (to the extent pattern lines show through) electrostatically charged web on a master paper pattern with size lines. The electrostatic web clings to the master multi-sized pattern, permitting drafting a sized pattern and cutting out the traced pattern.

In summary, there are a wide range of uses and configurations for the present invention. Preferred uses include the creation of visual display devices such as display and design boards, dolls, educational games and aids, and sewing patterns.

EXAMPLES

A meltblown web made of PP was prepared by a method described in PCT Application No. PCT/US/93/09630. The electret had the following properties:

Polymer - Polypropylene

Avg. fiber size - 1–10 micron

Avg. surface charge potential - 1844 v. (screen side)

Avg. surface charge potential - 1970 v. (face side)

The charged webs having a basis weight of 1.0, 2.0, and 3.5 $oz/yd^2$ were each secured to a 36"×36" rigid board, and various manipulatives of differing geometric shapes and materials were placed thereon with the board being maintained vertically. The manipulatives comprised newspaper, other charged meltblown webs, woven fabrics, butcher paper, light-weight construction paper, typing paper, notebook paper, and xerox paper.

The manipulatives remained affixed to the electret substrate for 3 weeks (when the test was discontinued) without the need of any other connectors. During the test, certain of the manipulatives were manually removed and reattached or rearranged to the substrate to demonstrate the use of the invention as a versatile and reliable visual aid.

For comparison, the same meltblown web without the charge was similarly tested. None of the manipulatives, except the charged manipulative, remained affixed to the uncharged substrate, but instead, almost immediately fell to the floor.

In another test, the same charged web (2.0 $oz/yd^2$) was cut in the form of a doll body (6 inches in height). A dress of woven fabric (cotton) was placed on the doll. The dress remained secured to the body. Electret accessories (e.g. pockets, collar) were secured to the woven fabric dress. They too remained secured to the fabric.

In still another test, a charged meltblown substrate (2.0 $oz/yd^2$) was used to support woven material cut into geometric shapes of the type used in quilting. The quilt pieces clung to the substrate and permitted manual positioning and rearrangement of the quilt pattern. Note that prior art quilt test patterns do not electrostatically cling to a substrate, but instead must be secured by pins, glue or other devices.

The above tests demonstrate the versatility of the nonwoven charged web. The cling resulting from the charge permits easy manipulation of the manipulative without the need for cumbersome tacks, pins, glue, etc. Although the present invention has been exemplified with charged nonwovens, it is again emphasized that the films electrostatically charged as taught in PCT/US/93/09630 can be used in accordance with principles covered in the present invention. The nonwovens, particularly meltblown, webs are preferred because of their texture.

What is claimed is:

1. A visual display device, comprising:

a) a support having affixed thereto a substrate of a nonwoven thermoplastic fabric, said fabric carrying a persistent electrostatic charge imparted to the fabric or fibers thereof by passing the fabric through an electrostatic field; and b) a manipulative article formed from materials selected from the group consisting of paper, fabrics having plant based fibers, fabrics having animal based fibers, and fabrics having thermoplastic fibers, said manipulative article being secured in detachable engagement with the nonwoven thermoplastic fabric by the electrostatic charge imparted to the nonwoven thermoplastic fabric.

2. The device of claim 1 wherein the charged thermoplastic fabric comprises a meltblown nonwoven fabric.

3. The device of claim 1 wherein the electrostatically charged nonwoven fabric is a meltblown nonwoven polypropylene fabric.

4. The device of claim 1 wherein the electrostatically charged nonwoven thermoplastic fabric has an average surface charge potential in excess of −100 v.

5. The device of claim 1 wherein the electrostatically charged nonwoven thermoplastic fabric has an average surface charge potential in excess of +100 v.

6. The device of claim 1 wherein the electrostatically charged nonwoven thermoplastic fabric is charged by a cold charging method.

7. The device of claim 1 wherein the manipulative article comprises a plurality of geometric pieces of quilting fabric arranged in the pattern of a quilting block, and is detachably secured to the nonwoven thermoplastic fabric by the electrostatic charge imparted to the nonwoven thermoplastic fabric.

8. The device of claim 1 wherein the manipulative article is a meltblown nonwoven fabric.

9. The display of claim 1 wherein the manipulative article is a meltblown fabric having a basis weight of 0.5 to 5.0 $oz/yd^2$.

10. A visual display device comprising (a) a planar substrate made of an electrically nonconductive material; and (b) a manipulative article made of nonwoven thermoplastic fabric having a persistent electrostatic charge being imparted to the fabric by passing the fabric or fibers thereof through an electrostatic field, the article being held in detachable engagement with the substrate by said electrostatic charge.

11. The display of claim 10 wherein the manipulative article has an average surface charge potential greater than 100 v., positive or negative.

12. The display of claim 10 wherein the substrate is made of glass.

13. The device of claim 10 wherein the substrate comprises materials selected from the group consisting of paper, and fabrics having plant based fibers, animal based fibers, and thermoplastic fibers.

14. The device of claim 10 wherein the charged thermoplastic fabric carries a charge with a surface charge potential of between 100 to 2000 v., negative or positive.

15. A visual display device comprising:

a) a support having affixed thereto a substrate of a nonwoven thermoplastic fabric, said fabric carrying a persistent electrostatic charge imparted thereto by passing the fabric or fibers thereof through an electrostatic field; and b) a plurality of manipulative articles formed from materials selected from the group consisting of paper, fabrics having plant based fibers, fabrics having animal based fibers, and fabrics having thermoplastic fibers, said articles being held in detachable engagement with the charged nonwoven thermoplastic fabric by said electrostatic charge imparted to the nonwoven thermoplastic fabric.

16. The device of claim 15 wherein the manipulative articles comprise a plurality of pieces of quilting fabric arranged in the pattern of at least one quilting block.

* * * * *